US005638679A

United States Patent [19]
Richards

[11] Patent Number: 5,638,679
[45] Date of Patent: Jun. 17, 1997

[54] HYDRAULIC VALVE WITH DUAL-MODE CAPABILITY

[75] Inventor: Paul D. Richards, Nokomis, Fla.

[73] Assignee: IMO Industries, Inc., Sarasota, Fla.

[21] Appl. No.: 494,802

[22] Filed: Jun. 26, 1995

[51] Int. Cl.[6] .......... F16D 31/02

[52] U.S. Cl. .......... 60/453; 60/460; 60/464; 91/420

[58] Field of Search .......... 60/385, 453, 460, 60/461, 464; 91/420

[56] References Cited

U.S. PATENT DOCUMENTS

| | | | |
|---|---|---|---|
| Re. 33,043 | 9/1989 | McBeth . | |
| 2,361,774 | 10/1944 | Koons . | |
| 2,787,235 | 4/1957 | Schroeder . | |
| 2,882,686 | 4/1959 | Griffith . | |
| 2,997,849 | 8/1961 | Shimanckas . | |
| 3,178,886 | 4/1965 | Watson . | |
| 3,258,923 | 7/1966 | Ballard . | |
| 3,333,416 | 8/1967 | Budzich | 60/460 |
| 3,363,418 | 1/1968 | Hebel et al. . | |
| 3,792,710 | 2/1974 | McDermott | 91/420 |
| 3,864,911 | 2/1975 | Gellatly et al. . | |
| 3,903,698 | 9/1975 | Gellatly et al. . | |
| 3,958,420 | 5/1976 | Yokota | 60/453 |
| 4,669,494 | 6/1987 | McBeth | 91/420 |
| 4,759,261 | 7/1988 | Flieter | 91/420 |
| 4,933,617 | 6/1990 | Huber et al. . | |
| 5,010,733 | 4/1991 | Johnson | 60/464 |
| 5,057,043 | 10/1991 | Sugimoto et al. . | |

*Primary Examiner*—F. Daniel Lopez
*Attorney, Agent, or Firm*—Jansson & Shupe, Ltd.

[57] ABSTRACT

The disclosure relates to a new valve and a hydraulic system incorporating such valve. A mode-selection assembly on the valve is adjustable between an open-loop position for system purging and a closed-loop position for normal system operation. A sealing member moves with the spool and with the mode-selection assembly in the open-loop position, the sealing member may be urged against a stationary abutment member in the valve. Such cooperative sealing member/abutment member contact blocks the closed-loop flow path and causes fluid to be "rerouted" to tank rather than back to the pump. The system is thereby temporarily converted to open-loop configuration for purging and is restored to closed-loop configuration by moving the mode-selection assembly to the closed-loop position. The new valve is particularly useful in hydraulic steering circuits for boats.

12 Claims, 6 Drawing Sheets

HYDRAULIC VALVE WITH DUAL-MODE CAPABILITY

FIELD OF THE INVENTION

This invention relates generally to what might be termed power plants and, more particularly, to hydraulic power systems.

BACKGROUND OF THE INVENTION

Hydraulic circuits and systems have been in use for decades and are often selected because of their "controllability," flexibility of design, and ease of installation and maintenance. Unlike mechanical drive trains, a hydraulic system is not bound by rigid shafts, gears and the like and can be used in applications where other types of drives would, at the least, be impractical.

A basic hydraulic circuit has a reservoir or tank holding hydraulic fluid and a source of pressurized fluid, i.e., a pump, driven by some sort of prime mover. Electric motors and internal combustion engines are common prime movers. And in a hydraulic boat steering system (where the pump is known as a helm pump and is attached to the boat steering wheel), the prime mover is the human operator manipulating such steering wheel.

A hydraulic circuit also has what may be termed a "work device," i.e., a device which uses pressurized fluid from the pump to produce a useful output, e.g., torque and rotary motion or linear force. Common work devices include hydraulic motors of the rotary or linear type. The latter are often called hydraulic cylinders and are available in single-acting and double-acting configurations. A single-acting cylinder has a single rod extending from and movable with respect to an elongate, tube-like housing. A double-acting cylinder has two rods, one extending from each end of the housing.

Known hydraulic circuits are configured in either of two fundamental types. In one type, known as an open-loop circuit, the pump draws fluid from the tank and delivers it to the motor, usually through a valve. Fluid expelled from the motor is returned to the tank.

In the other type, known as a closed-loop circuit, fluid expelled by the motor is returned directly to the pump rather than to the tank. Since such expelled fluid is expelled at a pressure, such pressure helps urge the fluid into the pump.

An advantage of an open-loop circuit is that the fluid (in which air is often entrained) is allow to "dwell" in the tank and give up air entrained therein. Fluid which is substantially free of entrained air is much preferred in a hydraulic circuit since the presence of air (which, unlike hydraulic fluid, is compressible) can make the circuit "spongy." To put it another way, it is easy to get rid of entrained air when using an open-loop circuit.

In a boat steering system, the helm pump is usually of the piston type because of their inherent higher efficiency and low leakage. In a common type of piston helm pump, there is within the housing an angled swash plate and a barrel with pistons reciprocating therein. Each piston is urged against the swash plate by a separate spring. The barrel is connected to the pump shaft and as the steering wheel is rotated, each piston moves in its bore in a direction to draw fluid into such bore and then moves in a direction to expel such fluid from the bore.

When used in a boat steering system, an open-loop circuit has some disadvantages. The most significant involves the fact that each pump piston must, in turn, "suck" fluid from the tank. The hydraulic line from the tank to the pump inlet port can impose a rather significant pressure drop.

In consequence, the springs urging the pistons against the swash plate must provide a rather high force to overcome such pressure drop and still retain the piston against the swash plate. Heavy, high-force springs require more effort on the steering wheel and make steering difficult.

Given the above, one would naturally conclude that a closed-loop circuit is the right choice for a boat steering system. This would not be an unreasonable conclusion since, because fluid is "forced" into the pump by the fluid-expelling motor, the piston springs can be much lighter and steering is quite easy. But in a boat steering application, closed-loop circuits are not without their problems.

The most significant arises when the circuit is first installed or when service needs to be performed. In either instance, the circuit must be purged of air so that steering is "solid" and responsive, not spongy. And in a closed-loop system, there is no easy way to purge air. This is so since fluid does not return from the motor to the tank where air would otherwise be released.

The patent literature recognizes the problem of air removal from a hydraulic system. U.S. Patent No. Re 33,043 (McBeth—a reissue of U.S. Pat. No. 4,685,293) describes a system for bleeding air from a closed-loop circuit. The system involves a valve with a number of manually-positioned check valves opened and closed in a sequence to pump oil alternately through lines to a tank. There is no suggestion as to how the valve may be "packaged" with the hydraulic pump to reduce plumbing and simplify system installation.

U.S. Pat. No. 2,882,686 (Griffith) shows a valve structure for use when bleeding or filling a closed-circuit hydraulic system. U.S. Pat. No. 4,933,617 (Huber et al.) depicts an open-loop steering system for boats. Significantly, the Huber et al. system uses force-amplifying servo-assisted steering in normal "non-autopilot" operation.

An improved valve which is very easy to use, which avails the industry of the advantages of both open- and closed-loop hydraulic circuits, as needed, and which may be readily manifolded to a hydraulic pump would be an important advance in the art.

OBJECTS OF THE INVENTION

It is an object of the invention to provide a new dual-mode valve overcoming some of the problems and shortcomings of the prior art.

Another object of the invention is to provide a new dual-mode valve which permits a hydraulic circuit to operate in either the open-loop or the closed-loop mode.

Another object of the invention is to provide a new dual-mode valve which can be quickly and easily converted between open-loop and closed-loop configuration.

Still another object of the invention is to provide a new dual-mode valve permitting hydraulic circuit bleeding without detaching hydraulic lines from circuit components.

Another object of the invention is to provide a new dual-mode valve which may be readily configured for attachment to a hydraulic pump.

Another object of the invention is to provide a dual-mode hydraulic circuit incorporating the new valve. How these and other objects are accomplished will become apparent from the following descriptions and from the drawing.

SUMMARY OF THE INVENTION

The invention is particularly useful in a hydraulic circuit having a pump, a tank and a "work device" such as a rotary or linear hydraulic motor. The new valve, useful with the described circuit, is of the type including a body with a tank port, first and second pump ports, first and second working ports and first and second flow paths. Each flow path extends between particular working and pump ports. Such flow paths are used during normal closed-loop operation and permit fluid expelled from the hydraulic motor to return directly to the inlet port of the pump without returning to the tank. The valve also has an internal cavity having a spool assembly movable in the cavity.

The improved valve has a dual-mode capability so that the circuit in which the valve is used can be normally operated in closed-loop configuration but can also be operated in open-loop configuration during system purging to remove entrapped air. Such "dual-mode" operation is made possible by a mode-selection assembly adjustable between a first or open-loop position and a second or closed-loop position.

An abutment member is stationary in the body and a sealing member moves with the spool assembly. With the mode-selection assembly in the open-loop position, the sealing member may be urged (by pressurized fluid from the pump) against its abutment member, thereby blocking a flow path. That is, fluid expelled from the hydraulic motor cannot flow from such motor and through the flow path directly back to the pump. Rather, such fluid is "bypassed" through a spool passage to the valve tank port and thence to the tank. Fluid-entrained air rises to the top of the fluid in the tank and is thereby substantially prevented from re-entering the system.

In a specific embodiment, the new valve has a check valve and a valve seat which is contacted by the check valve. When the sealing member moves into contact against the abutment member, an apertured "nose-like" projection on the sealing member restrains the check valve from contacting its valve seat.

On the other hand, when the mode-selection assembly in the normal closed-loop position, the sealing member is prevented from contacting the abutment member. In the absence of pressurized fluid from the pump, the check valve contacts its valve seat to form a locking circuit, i.e., a circuit locking the motor in position. With the mode-selection assembly in the closed-loop position and assuming there is pressurized fluid from the pump, the flow path between a working port and its "companion" pump port is kept open. Fluid is thus permitted to flow from the hydraulic motor along the flow path and directly back to the pump.

In yet another aspect of the invention, when the mode selector is in the first or open-loop position, the check valve moves to a first location under the urging of the nose-like projection on the sealing member. Permitting such movement of the check valve well away from its valve seat allows the sealing member to travel sufficiently far to contact the abutment member and block the flow path from a valve work port to a valve pump port.

Such mode selector has a restraining device and when the mode selector is in the second position, the restraining device prevents the check valve from moving to the first location. The check valve thereby prevents the spool assembly and, particularly, its sealing member from moving sufficiently far to contact the abutment member. The flow path is thereby maintained open.

In another aspect of the invention, the new valve is configured in recognition of the fact that during operation, the quantity of fluid flowing into a work device such as a hydraulic motor, may be slightly less than the quantity expelled from such device. This very-slight volumetric difference is due to leakage, manufacturing tolerances and the like.

In the new valve, the above-mentioned bypass passage has an orifice restricting flow therealong when the mode-selection assembly is in the second position. The orifice, having a cross-sectional area much less than that of a flow path between a working and a pump port, is of little consequence if the motor is quite "symmetrical," input to output. But if the quantity of fluid expelled from the motor is significantly greater than that quantity flowing into the motor, the pressure in the flow path will rise since the pump cannot accept the expelled fluid in sufficient volume. The orifice forms a "bleed path" to tank and prevents such pressure from rising unduly.

From the foregoing, it is to be appreciated that the new valve can be configured to function in a unidirectional circuit involving a rotary-type hydraulic motor. (Of course, the circuit cannot practically be unidirectional if the work device is a hydraulic cylinder. Sooner or later, the cylinder will reach the end of its stroke and must be reversed.) In other words, if the new valve has one each work port, pump port, mode-selection assembly, abutment member, sealing member and bypass passage, such valve will nevertheless provide both open-loop and closed-loop operation in a unidirectional circuit having a rotary motor. However, the preponderance of hydraulic circuits (and all hydraulic circuits used for boat steering) are bi-directional.

Therefore, in a highly preferred embodiment, the new valve has a second pump port, a second working port, and a second flow path between the second working port and the second pump port. There is also a second mode-selection assembly mounted to the valve body and adjustable between a first position and a second position. A second abutment member is in the body and a second sealing member moves with the spool assembly. With the second mode-selection assembly in the first or open-loop position, the second sealing member may be urged against the second abutment member, thereby substantially blocking the second flow path between the second working port and the second pump port.

The bi-directional valve also has a second bypass passage for flowing fluid from the second working port to the tank port with the second flow path is blocked. Such valve has two check valves and a valve seat for each. The first sealing member restrains the first check valve from contacting the first valve seat when the first sealing member is against the first abutment member. Similarly, the second sealing member restrains the second check valve from contacting the second valve seat when the second sealing member is against the second abutment member.

Another aspect of the invention involves a hydraulic circuit which includes (a) a hydraulic pump having first and second apertures, (b) a fluid-holding tank, and (c) a bi-directional output motor. A valve is connected to the pump apertures, to the tank and to the output motor and is adjustable between an open-loop position and a closed-loop position. The circuit may be purged of air when the valve is in the open-loop position and operated normally when the valve is in the closed-loop position.

More specifically, in a bi-directional circuit such as a boat steering circuit, the hydraulic pump may be rotated in a first direction or in a second direction. With the first mode-selection assembly in the open-loop position and the pump rotating in the second direction, the first sealing member is against the first abutment member, thereby substantially blocking the first flow path. The motor (which in a steering circuit is often a bi-directional cylinder) expels fluid to the first working port. In turn, such fluid flows along the first flow passage and thence to the tank port.

In yet another aspect of the invention (and considering the hydraulic circuit mentioned above), fluid expelled by the motor is directed to the tank when the mode selector is in the first or open-loop position. However, when the mode selector is in the second position, fluid expelled by the motor flows directly to the pump without passing through the tank.

Other details of the new valve and a new hydraulic circuit using such valve are set forth in the following detailed description and in the drawing. In the detailed description, the term "oil" is used to denote an incompressible liquid. It is to be appreciated that other types of liquids, e.g., synthetics and/or biodegradable liquids may be used.

DETAILED DESCRIPTION OF PREFERRED EMBODIMENTS

Figure 1:
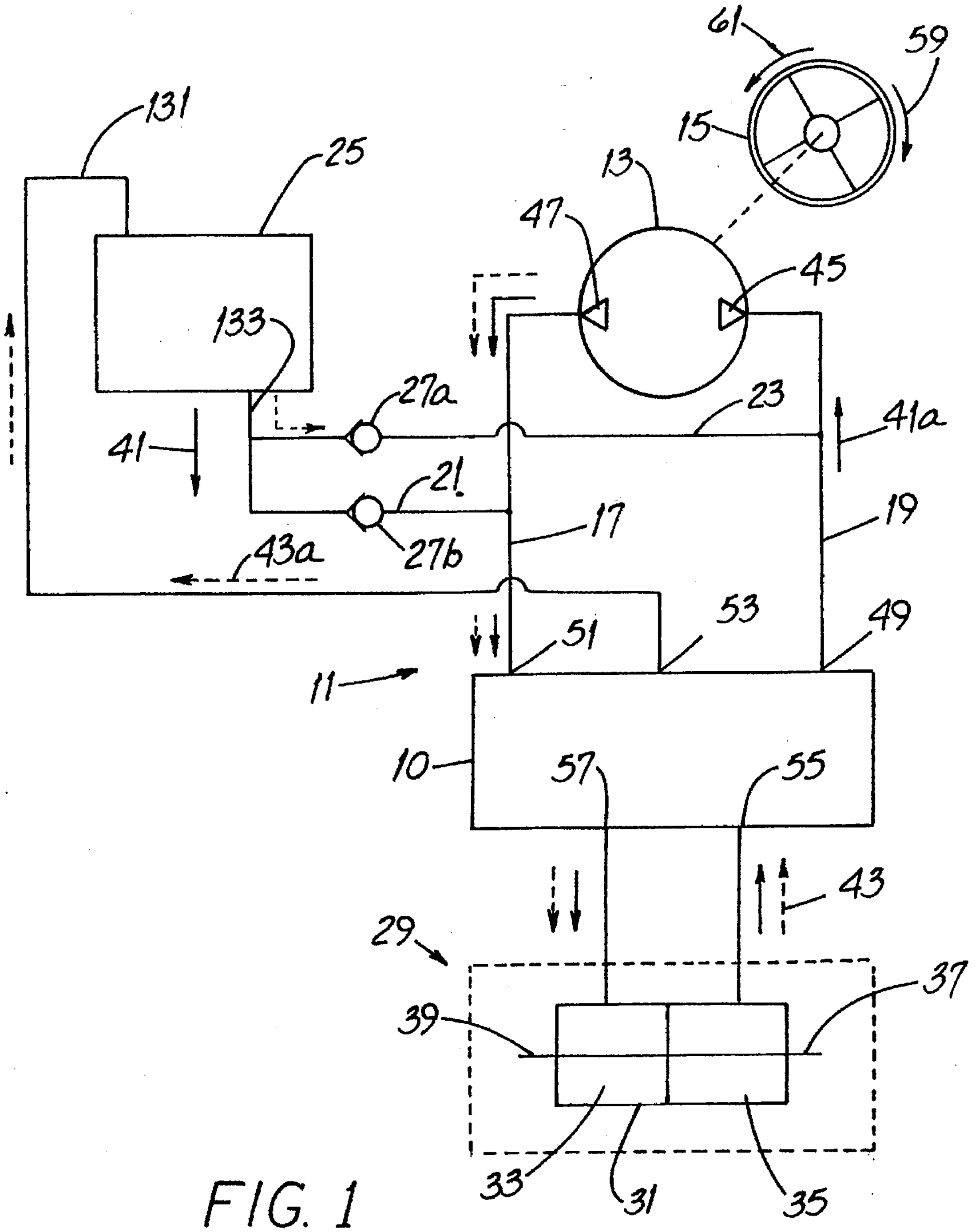
FIG. 1 is a diagram showing an outline of the new valve in conjunction with a hydraulic circuit.

Referring first to FIG. 1, the following is an overview description of the new valve 10 and of an exemplary hydraulic circuit 11 in which such valve 10 may be used. The circuit 11 includes a pump 13 powered by a prime mover which, in a specific embodiment, is a person rotating a boat steering wheel 15. The pump 13 is connected by hydraulic lines 17, 19 to the valve and by lines 21, 23 to an oil-holding tank 25. Connection to the tank 25 is through a pair of one-way replenishing check valves 27, the purpose of which is explained below.

The valve 10 is connected to a work device 29 and a specific device 29, a double-ended hydraulic cylinder 31 is portrayed. When pressurized oil is introduced into one or the other chambers 33, 35 of the cylinder 31, the cylinder rods 37, 39 move right or left as viewed in FIG. 1. If the cylinder 31 is attached to, e.g., a boat rudder, the rudder is also appropriately positioned. Oil expelled from the cylinder 31 is directed through the valve 10 and back to the pump 13 in closed-loop operation or to the tank 25 in open-loop operation.

To aid understanding, FIG. 1 is marked with several solid-line arrows 41 which denote oil flow when the valve 10 and circuit 11 are in the closed-loop configuration. The dashed-line arrows 43 denote oil flow when open-loop configuration is used and in both instances, oil flow is shown for only one direction of pump rotation, i.e., rotation in a direction to provide pressurized oil from the aperture 47.

More specifically, the pump 13 has first and second apertures 45 and 47, respectively. Such apertures 45, 47 are respectively connected to the first and second pump ports 49 and 51 the valve tank port 53 is connected to the tank 25. The first and second working ports 55, 57, respectively, of the valve 10 are connected to the first and second cylinder chambers 35 and 33, respectively.

When the wheel 15 and pump 13 are rotated in a first direction as symbolized by the arrow 59, the pump 13 delivers pressurized fluid from the first aperture 45 to the first pump port 49 of the valve 10 and thence to the first working port 55 and the first cylinder chamber 35. The second aperture 47 serves as an inlet through which oil is drawn into the pump 13.

On the other hand, when the wheel 15 and pump 13 are rotated in a second direction as symbolized by the arrow 61, the pump 13 delivers pressurized fluid from the second aperture 47 to the second pump port 51 of the valve 10 and thence to the second working port 57 and the second cylinder chamber 33. The first pump aperture 45 serves as the inlet.

As will become apparent from the following description, whether oil being expelled from the cylinder 31 is caused to flow back to the pump 13 (as symbolized by the solid-line arrow 41*a*) or to the tank 25 (as symbolized by the dashed-line arrow 43*a*) is determined by whether the valve 10 is set in the closed-loop mode or the open-loop mode, respectively. Details of the new valve 10 will now be set forth.

Figure 2:
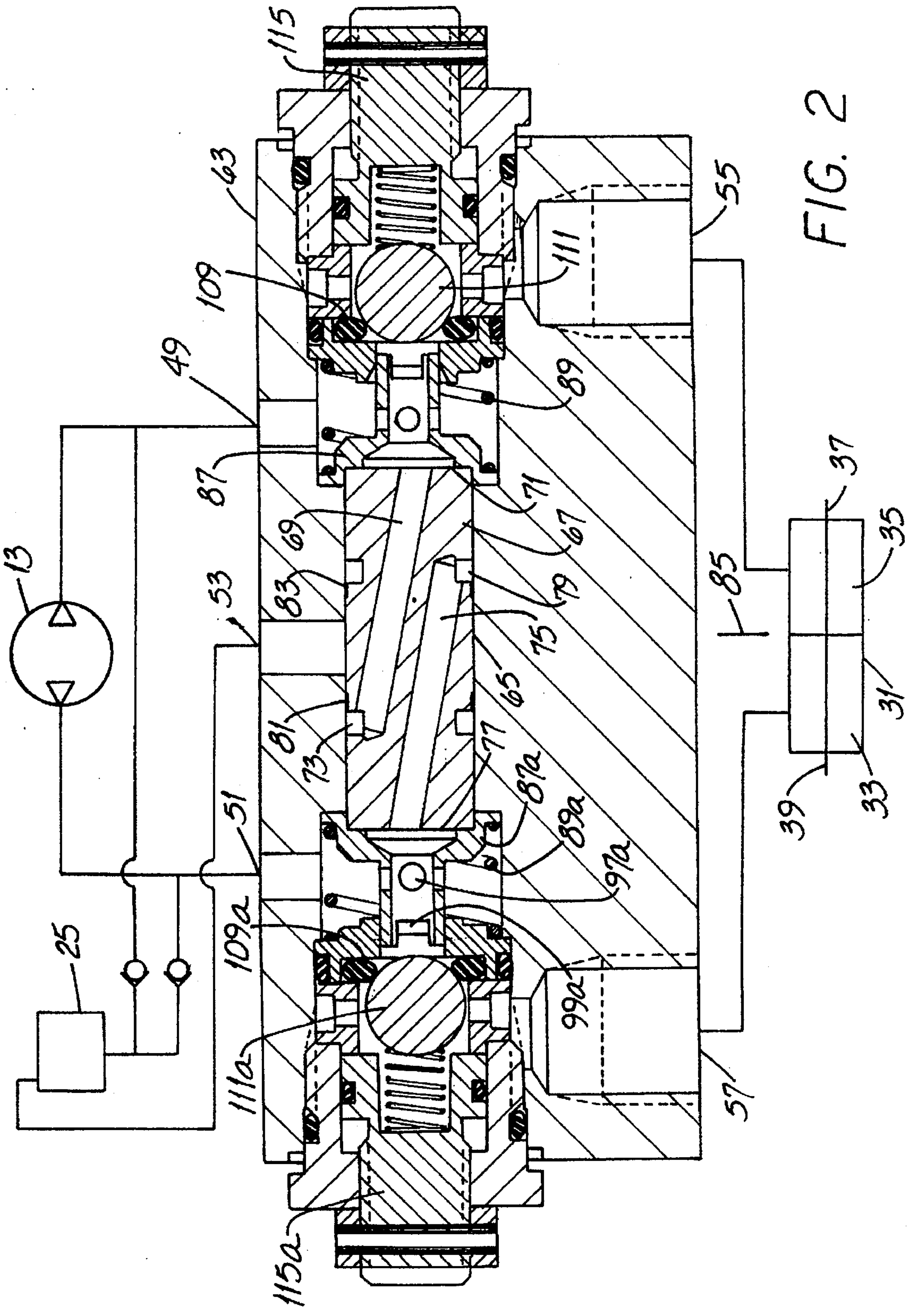
FIG. 2 is a cross-sectional elevation view of the new valve shown with the mode selectors in their closed-loop positions and the valve spool in its centered or "lock-up" position.
Figure 3:
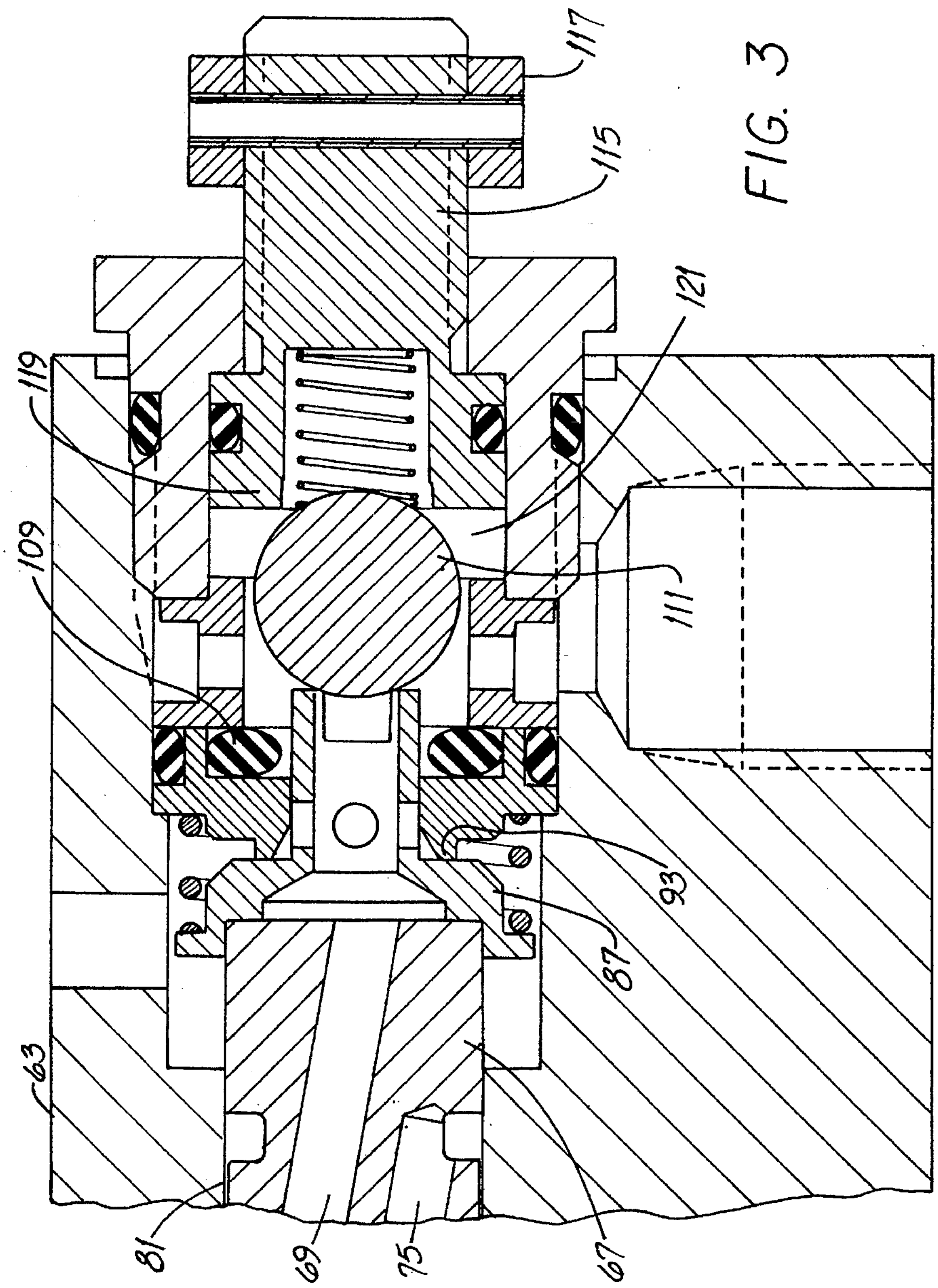
FIG. 3 is an enlarged cross-sectional elevation view of a portion of the valve of FIG. 2 showing a mode selector in its open-loop position and the valve spool biased rightwardly. Parts are broken away.
Figure 4:
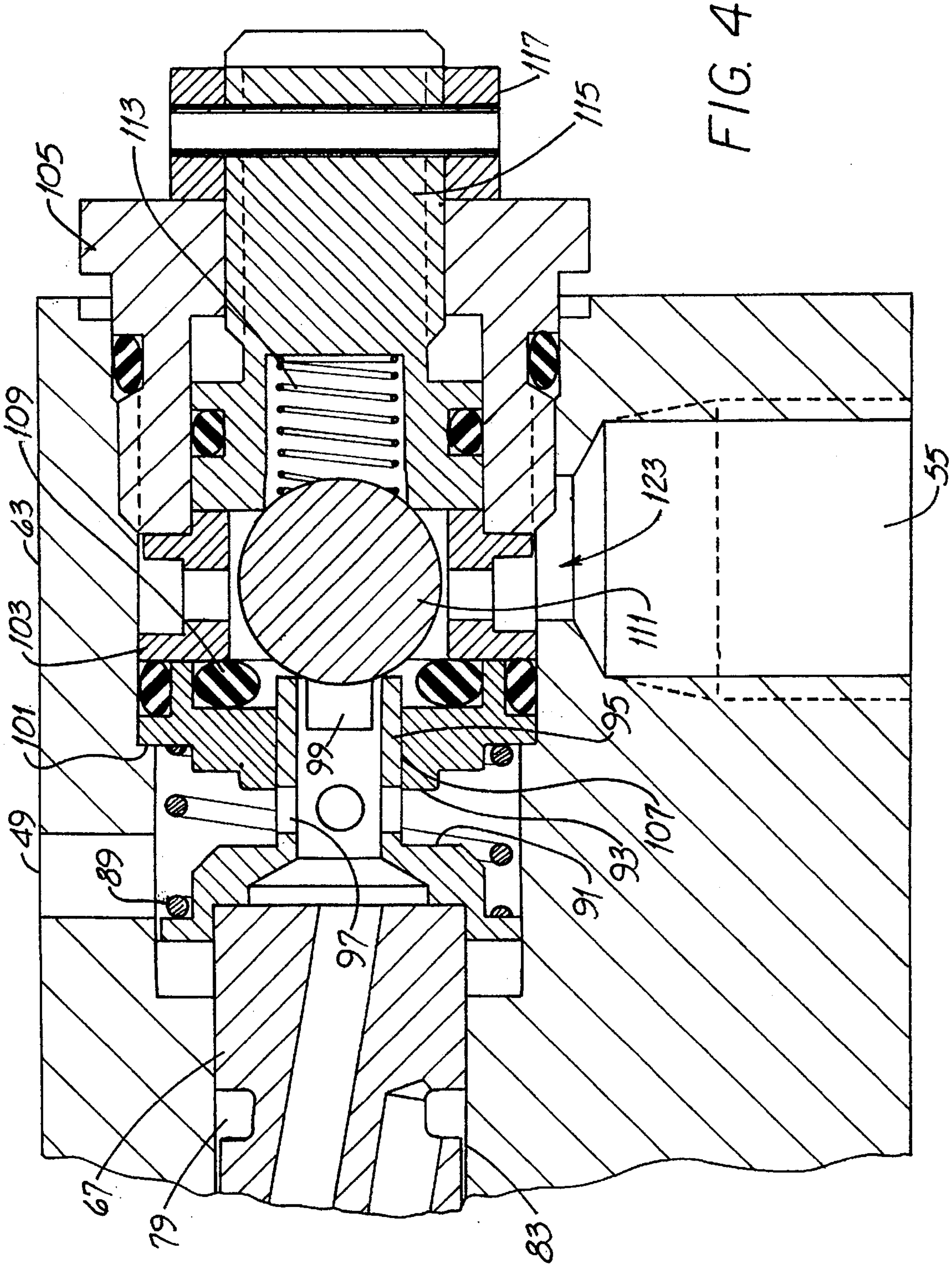
FIG. 4 is an enlarged cross-sectional elevation view of a portion of the valve of FIG. 2 showing a mode selector in its closed-loop position and the valve spool biased rightwardly. Parts are broken away.

The component parts of the new valve 10 will be described first. Referring also to FIGS. 2, 3 and 4, such valve 10 has a body 63 with a generally-cylindrical internal cavity 65 and a spool 67 mounted for sliding movement in such cavity 65. The spool 67 has a first angled passage 69 extending from the first spool end 71 to a first annular groove 73. Similarly, there is a second angled passage 75 extending from the second spool end 77 to a second annular groove 79. Adjacent to the grooves 73 and 79 are shallow annular "undercuts" 81 and 83, respectively. Such undercuts 81, 83 function (in the matter described below) as orifices restricting flow along the passage 75 or 69, respectively, when the valve 10 is in the closed-loop mode.

But for the spool 67, the valve 10 is substantially symmetrical about a plane normal to the drawing sheet and coincident with the line 85. Therefore, only the parts at the right end of the valve 10 will be described and are preceded by the word "first." The corresponding parts at the left end of the valve 10 are identified by corresponding lead-line numbers followed by the suffix "a" and are denoted as "second" parts.

A first sealing member 87 is mounted on the spool 67 and retains and guides the first spring 89. The member 87 has an annular face 91 which, under certain conditions, contacts and seals against the first abutment member 93. The sealing member 87 includes a hollow, nose-like projection 95 having several radial openings 97 and several flow notches 99 formed therein.

The abutment member 93 (which also retains and guides the spring 89) is lodged against a shoulder 101 in the body 63. Such member 93 and the part 103 are clamped by a first threaded retaining bushing 105. The abutment member 93 has an opening 107 which, under certain conditions, receives the projection 95 with slight sliding clearance. Mounted to the abutment member 93 is a first resilient check valve seat 109 and a first spherical check valve 111 is positioned in the body 63 so that under the urging of the spring 113, such valve 111 contacts and seals against the seat 109 for the purposes and under the conditions described below.

Threaded to the bushing 105 is a first mode selector 115 which includes a knob 117 for rotating such selector 115 into and out of the bushing 105. Such selector 115 has a restraining device 119 and when the knob 117 is rotated to move the selector 115 rightwardly - as viewed in FIG. 3 - to the first position, the restraining device 119 becomes further spaced from the valve seat 109.

Movement of the selector 115 to the first position (used in the open-loop mode) permits the check valve 111 to move to the first location 121, also shown in FIG. 3. Significantly, such location 121 is quite far to the right. Under certain conditions, the spool 67 can move rightwardly and urge the seal member 87 into sealing contact with the abutment member 93 without the check valve 111 interfering with the travel of the projection 95. Such sealing contact is shown in FIG. 3. Stated another way, the check valve 111 is out of the way and does not obstruct travel of the seal member projection 95.

When the selector 115 is in the second "threaded-in" position as shown in FIG. 4, the check valve 111 is prevented from moving to the first location 121. Therefore, when the spool 67 is biased rightwardly, such check valve 111 limits travel of the seal member 87 in that the projection 95 comes into contact with the check valve 111 before the seal member 87 contacts the abutment member 93. The way in which such biasing occurs is described below.

Further considering FIG. 4, the check valve 111 is held away from its seat 109 by the projection 95 and there is a first flow path 123 extending from the first working port 55 through the flow notches 99, through the radial openings 97, past the spring 89 and through the first pump port 49 to the first pump aperture 45. And the check valve 111 is prevented by the restraining device 119 from moving to the first location 121 so that the sealing member 87 cannot contact the abutment member 93.

The operation of the new valve 10 and an associated circuit 11 will now be described. Considering FIG. 2, the mode selectors 115, **115*a* are in the second position configuring the valve 10 and circuit 11 for closed loop operation. It is assumed the pump 13 is not rotating and, therefore, no pressurized oil is flowing from either aperture 45, 47. Under those conditions, the spool 67 is centered and the check valves 111 and 111*a* are urged against their respective seats 109, 109*a*. The valve 10 is thereby in a "lock-up" position in that no oil can flow from either of the chambers 33, 35. The cylinder rods 37, 39** (and, e.g., a boat rudder attached thereto) are held in the selected position.

Figure 5:
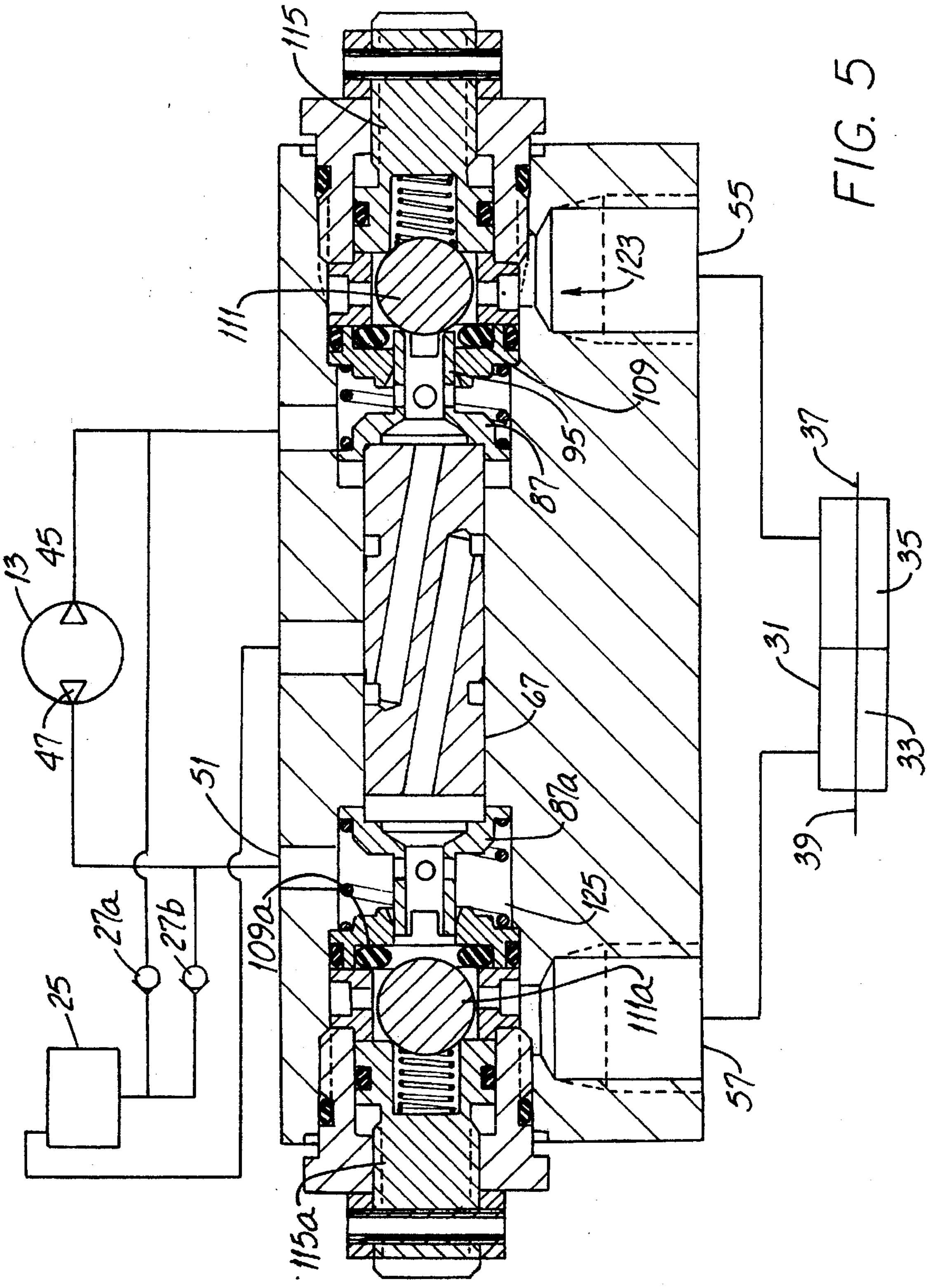
FIG. 5 is a circuit diagram generally like that of FIG. 1 and showing the valve with the mode selectors in their closed-loop positions and the valve spool biased rightwardly.

Referring next to FIG. 5, the mode selectors 115, **115*a* remain in the second or closed-loop position. It is assumed that the pump 13 is rotated in such a direction that pressurized oil flows from the second aperture 47 to the second pump port 51 of the valve 10. Such pressurized oil raises the pressure in the portion 125 of the cavity 65, urges the check valve 111a away from its seat 109*a* and urges the spool 67 rightwardly away from the second sealing member 87*a* so that the projection 95 of the first sealing member 87 drives the first check valve 111 away from its seat 109. Both check valves 111, 111*a* are now away from their respective seats 109, 109*a***.

Pressurized oil flows through the working port 57 and into the chamber 33 of the cylinder 31, causing rightward movement of the rods 37, 39. Since the volume of the chamber 35 is thereby caused to diminish, low-pressure oil is expelled from the chamber 35 and flows along the flow path 123 to the first aperture 45 of the pump 13, such aperture 45 then serving as the pump inlet. When pump rotation stops, the spool 67 and check valves 111, **111*a* assume the positions shown in FIG. 2. By the aforedescribed activity, the cylinder 31** has been brought to a new position.

(It should be noted here that if the pump 13 delivers somewhat more oil from its second aperture 47 than enters the first aperture 45—and component leakage can cause such flow differential—the needed make-up oil is drawn from the tank 25 across the replenishing check valve **27*a*. Two replenishing check valves 27 are shown, one for each direction of pump rotation. And if a slightly greater volume of oil flows into the first working port 55 than is drawn in by the pump through its first aperture 45, the excess bleeds across the first orifice undercut 81 to tank 25**.)

Figure 6:
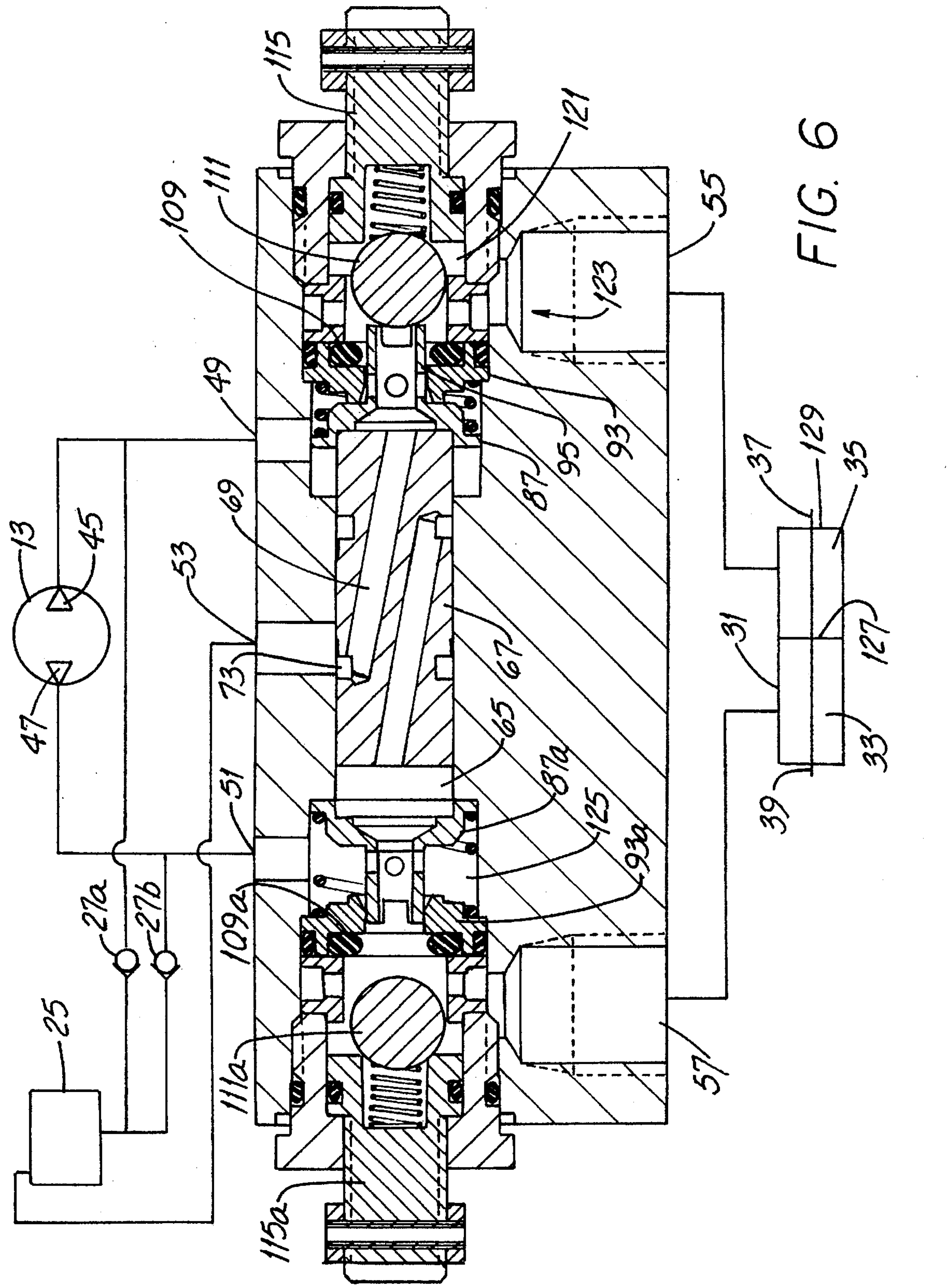
FIG. 6 is a circuit diagram generally like that of FIG. 1 and showing the valve with the mode selectors in their open-loop positions and the valve spool biased rightwardly.

Referring next to FIG. 6, it is assumed that the user wishes to purge entrained air from the circuit 11. Air entrainment usually occurs upon initial installation and start-up of the circuit 11 or after performing maintenance thereon. The mode selectors 115, **115*a* are threaded to their outward, first positions and the pump 13 is rotated in either direction. For this part of the description, it is assumed that the pump is rotated in a direction to provide pressurized oil at the second aperture 47 and, thus, to the second pump port 51 of the valve 10**.

Such pressurized oil raises the pressure in the portion 125 of the cavity 65, urges the check valve **111*a* away from its seat 109*a* and urges the spool 67 rightwardly away from the second sealing member 87*a* so that the projection 95 of the first sealing member 87 is urged rightward and drives the first check valve 111 away from its seat 109. Both check valves 111, 111*a* are now away from their respective seats 109, 109*a*, oil is being delivered into the cylinder chamber 33 and expelled from the chamber 35**.

By comparing FIG. 6 with FIGS. 4 and 5, it will be noted that because the first mode selector 115 is in its first position, the first check valve 111 is in the first location 121 and does not limit travel of the first sealing member 87. Consequently, the spool 67 travels sufficiently far that the first sealing member 87 contacts the abutment member 93 and blocks the first flow path 123. Oil can no longer flow along the entirety of such flow path 123 to the first pump port 49.

Oil expelled from the chamber 35 flows through the notches 99 but cannot flow through the radial openings 97 because of the sealing contact of the member 87 to the member 93. Oil therefore flows along the first passage 69 to the groove 73, the tank port 53 and thence to the tank 25, carrying entrained air with it. And since the pump 13 cannot draw oil into the first aperture 45 from the flow path 123, oil is drawn from the tank 25 across the check valve **27*a* and into the first aperture 45**.

Rotation of the pump in the aforedescribed direction continues until the cylinder 31 "bottoms out," i.e., until the head 127 contacts the cylinder wall 129. The direction of pump rotation is then reversed, the spool 67 is biased leftwardly and the head 127 and rods 37, 39 are urged leftwardly.

Typically, several reversals of the pump 13 and cylinder 31 are needed to substantially completely purge the circuit 11 of air. After purging is complete, the mode selectors 115, **115*a* are threaded inwardly to their second, closed-loop positions and the circuit 11** is operated normally in such closed-loop configuration.

Although generally known to persons of ordinary skill in the art, the way in which the lines are connected to the tank 25 deserve brief mention. Referring again to FIG. 1, it will be noted that the line 131 always functions as a return line in that oil flowing through such line 131 (which, during purging, has some air entrained therein) always flows toward the tank 25 rather than away from it. And such line 131 is connected toward one side of the tank 25 and near the top so that entrained air need only rise a short distance through the oil before it dissipates in the air space above the oil.

On the other hand, the line 133 always functions as a "suction" or outflow line in that oil flowing through such line 133 always flows away from the tank 25. The line 133 is connected near the bottom of the tank 25 (where the oil is substantially free of air) and is displaced laterally to one side of the line 131. Such lateral displacement maximizes the distance between the return line 131 (which may be discharging "frothy" air-laden oil) and the suction line 133 where air-free oil is needed.

While the principles of the invention have been described in connection with specific embodiments, it is to be understood clearly that such embodiments are exemplary and are not limiting.

What is claimed is:

1. In a hydraulic valve including a body having (a) a first pump port, (b) a first working port, (c) a first flow path between the first working port and the first pump port, and (d) an internal cavity having a spool assembly movable therein, the improvement comprising:

a first mode-selection assembly mounted to the body and adjustable between a first position and a second position;

a first abutment member in the body; and a first sealing member moving with the spool assembly; and wherein:

with the first mode-selection assembly in the first position, the first sealing member is free to be urged against the first abutment member, thereby substantially blocking the first flow path.

2. The valve of claim 1 including a tank port and wherein:

the spool assembly includes a first passage for flowing fluid from the first working port to the tank port when the first flow path is blocked.

3. The valve of claim 2 including a first check valve and a first valve seat and wherein:

the first sealing member restrains the first check valve from contacting the first valve seat when the first sealing member is against the first abutment member.

4. The valve of claim 1 wherein:

with the mode-selection assembly in the second position, the first sealing member is prevented from contacting the first abutment member, thereby permitting flow along the first flow path between the first working port and the first pump port.

5. The valve of claim 4 including a tank port and wherein:

the spool assembly includes a first passage in flow communication between the first working port and the tank port; and the first passage includes a first orifice restricting flow therealong when the mode-selection assembly is in the second position.

6. The valve of claim 1 wherein the body also has (a) a second pump port, (b) a second working port, and (c) a second flow path between the second working port and the second pump port, and the valve further includes:

a second mode-selection assembly mounted to the body and adjustable between a first position and a second position;

a second abutment member in the body; and a second sealing member moving with the spool assembly;

and wherein:

with the second mode-selection assembly in the first position, the second sealing member is free to be urged against the second abutment member, thereby substantially blocking the second flow path between the second working port and the second pump port.

7. The valve of claim 6 including a tank port and wherein the spool assembly includes:

a first passage for flowing fluid from the first working port to the tank port when the first flow path is blocked; and a second passage for flowing fluid from the second working port to the tank port with the second flow path is blocked.

8. The valve of claim 7 including first and second check valves and first and second valve seats and wherein:

the first sealing member restrains the first check valve from contacting the first valve seat when the first sealing member is against the first abutment member; and the second sealing member restrains the second check valve from contacting the second valve seat when the second sealing member is against the second abutment member.

9. In a hydraulic circuit for steering a boat and including (a) a hand-actuated hydraulic pump having first and second apertures, (b) a fluid-holding tank, and (c) a bi-directional output motor, the improvement comprising:

a valve connected to the pump apertures, to the tank and to the output motor, and wherein:

the valve is manually adjustable between an open-loop configuration and a closed-loop configuration;

the pump flows fluid from the first aperture through a line, through the valve and through the output motor to the tank when the valve is in the open-loop configuration for bleeding the circuit; and the pump flows fluid from the first aperture through the line, through the valve, through the output motor and thence to the second aperture when the valve is in the closed-loop configuration for steering the boat.

10. The circuit of claim 9 wherein the hydraulic pump may be rotated in a first direction or in a second direction and the valve includes:

a first mode-selection assembly adjustable between the open-loop position and the closed-loop position;

a spool assembly, a first abutment member and a first working port;

a first flow path connected to the first working port; and a first sealing member moving with the spool assembly; and wherein:

with the first mode-selection assembly in the open-loop position and the pump rotating in the second direction, the first sealing member is against the first abutment member, thereby substantially blocking the first flow path.

11. The circuit of claim 10 wherein:

the valve includes a tank port;

when the pump is rotated in the second direction, the motor expels fluid to the first working port; and the valve has a first flow passage in flow communication with the first working port and the tank port, whereby fluid expelled by the motor is directed to the tank port.

12. In a hydraulic circuit including (a) a hydraulic pump, (b) a fluid-holding tank, (c) a bi-directional output motor having a pair of ports, and (d) a valve assembly connected to the pump, to the tank and to the output motor, the improvement wherein:

the valve assembly includes a mode selector adjustable between a first position and a second position;

when the mode selector is in the first position, fluid expelled by the motor from either of the ports is directed to the tank; and when the mode selector is in the second position, fluid expelled by the motor is directed to the pump and wherein:

the valve assembly includes a check valve and a valve seat;

when the mode selector is in the first position, the check valve is free to move away from the seat; and the mode selector includes a restraining device preventing the check valve from moving away from the seat when the mode selector is in the second position.

* * * * *